Figure 1:
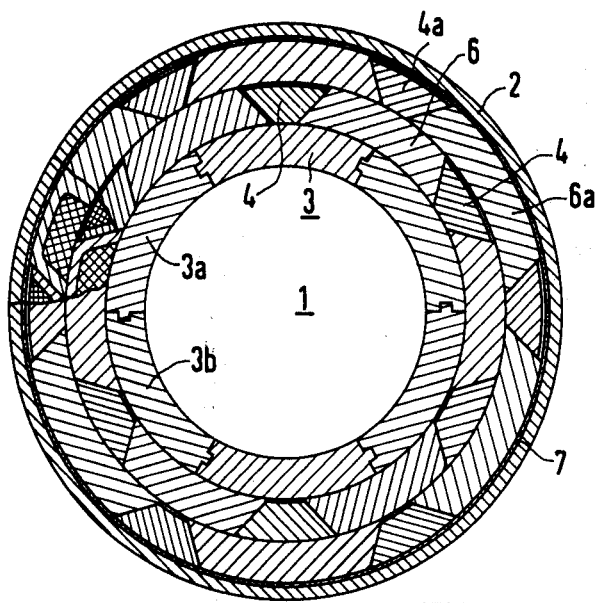

United States Patent [19]

Haas et al.

[11] 4,284,106

[45] Aug. 18, 1981

[54] PIPE OR VESSEL WITH INTERNAL LINING

[75] Inventors: Karl-Heinz Haas, Lauf; Werner Lang, Calw-Stammheim, both of Fed. Rep. of Germany

[73] Assignee: Kraftwerk Union Aktiengesellschaft, Mulheim, Fed. Rep. of Germany

[21] Appl. No.: 37,120

[22] Filed: May 8, 1979

[30] Foreign Application Priority Data

May 9, 1978 [DE] Fed. Rep. of Germany ....... 2820174

[51] Int. Cl.³ .......................... F16L 9/14; F27D 3/02
[52] U.S. Cl. .................................. 138/147; 138/155; 138/162; 432/233; 432/234
[58] Field of Search ............... 138/155, 157, 162, 164, 138/166, 147, 140, 149, 148; 432/233, 234

[56] References Cited

U.S. PATENT DOCUMENTS

| | | | |
|---|---|---|---|
| 1,462,605 | 7/1923 | Le Cocq et al. | 138/157 |
| 1,834,603 | 12/1931 | Currie | 138/147 |
| 4,061,162 | 12/1977 | Jones et al. | 138/147 |
| 4,170,451 | 10/1979 | Luff | 432/234 |

FOREIGN PATENT DOCUMENTS

2296831 7/1976 France .................................. 432/234

*Primary Examiner*—Steven L. Stephan
*Attorney, Agent, or Firm*—Herbert L. Lerner

[57] ABSTRACT

In combination, for receiving hot gases, a hollow cylindrical body such as a tube or vessel and an inner lining therefor formed of molded-block walls, the inner lining includes a hollow inner cylindrical member having mutually spaced-apart wedge-shaped keystones with radially inwardly narrowing cross section disposed at the outer circumference thereof, metallic anchors respectively fastening the keystones to the inner cylindrical member, and insulating blocks, respectively, entirely filling in the space between each two keystones whereby intermediate layers for connecting the insulating blocks to the keystones are dispensed with.

2 Claims, 3 Drawing Figures

U.S. Patent        Aug. 18, 1981        Sheet 1 of 2        4,284,106

PIPE OR VESSEL WITH INTERNAL LINING

The invention relates to a vessel or a pipe with an internal or inner lining for receiving hot gases, using walls of shaped or molded blocks.

In furnaces, for example, it is generally known to provide an inner lining of shaped or molded blocks or bricks as protection against high temperatures. For storing and transporting hot gases under overpressure or excess pressure, it is necessary, however, to provide vessels or pipes with inner insulation, with which the internal pressure is absorbed by the pipe or vessel wall and with which the walls serving for insulation in the interior of the pipe or the vessel wall experiences no undue thermal stresses.

It has become known heretofore, for example, to dispose a gas guide tube inside a pipe containing a pressurized medium and to provide insulation formed of hollow ceramic spheres or balls between the tube and the pipe. Thermal stresses are avoided by the fact that the space therebetween is not completely filled with the hollow spheres.

It is accordingly an object of the invention to provide an inner lining for pipes or vessels wherein the inner lining is formed of shaped or molded ceramic blocks having a minimum of gaps therebetween, and wherein, nevertheless, no undue thermal stresses occur in the interior of the pipe vessel at varying temperatures. With the foregoing and other objects in view, there is provided, in accordance with the invention, in combination, for receiving hot gases, a hollow cylindrical body such as a tube or vessel and an inner lining therefor formed of molded-block walls, the inner lining comprising a hollow inner cylindrical member having mutually spaced-apart wedge-shaped keystones with radially inwardly narrowing cross section disposed at the outer circumference thereof, metallic anchors respectively fastening the keystones to the inner cylindrical member, and insulating blocks, respectively, entirely filling in the space between each two keystones whereby intermediate layers for connecting the insulating blocks to the keystones are dispensed with.

In accordance with another feature of the invention, the hollow inner cylindrical member is formed of ceramic molded blocks.

In accordance with a further feature of the invention, the hollow cylindrical body is a tube, and the hollow inner cylindrical member is a gas guide tube.

In accordance with an added feature of the invention, the hollow cylindrical body is a vessel, and the hollow inner cylindrical member is an inner vessel.

In accordance with a concomitant feature of the invention, the combination includes a quantity of casting material disposed between the inner lining and the hollow cylindrical body.

Other features which are considered as characteristic for the invention are set forth in the appended claims. Although the invention is illustrated and described herein as embodied in a pipe or vessel with internal lining, it is nevertheless not intended to be limited to the details shown, since various modifications and structural changes may be made therein without departing from the spirit of the invention and within the scope and range of equivalents of the claims.

Figure 2:
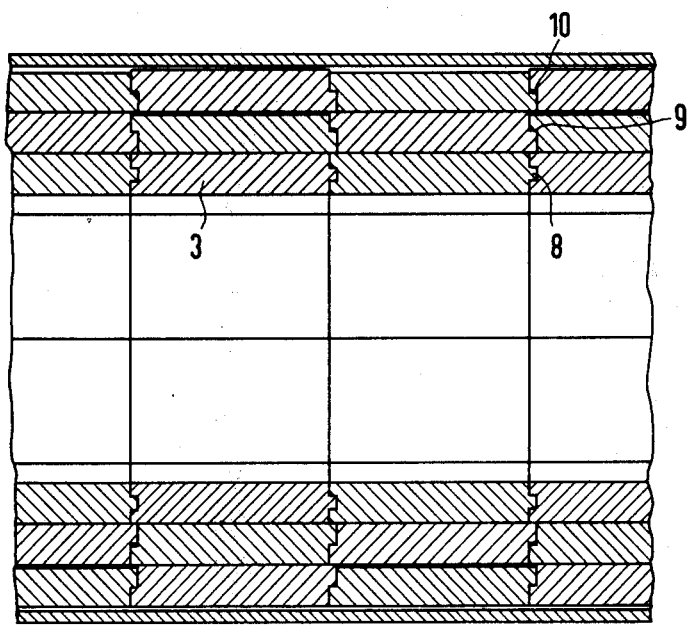
Figure 3:
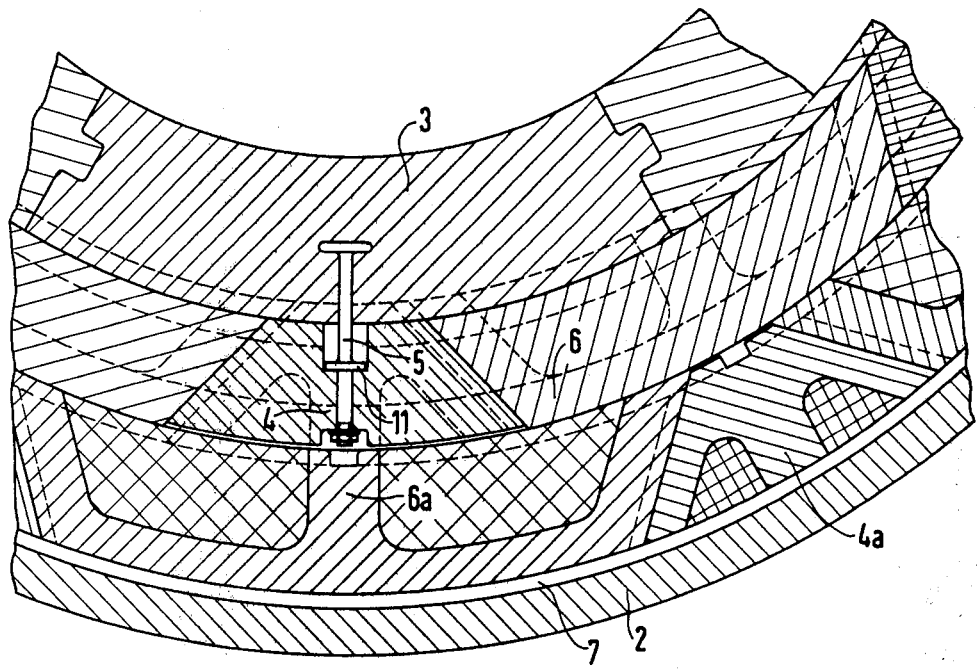

The construction and method of operation of the invention, however, together with additional objects and advantages thereof will be best understood from the following description of specific embodiments when read in connection with the accompanying drawings, in which:

FIGS. 1 and 2 are cross-sectional and fragmentary longitudinal sectional views, respectively, of a pipe lined in accordance with the invention; and FIG. 3 is an enlarged fragmentary view of FIG. 1 showing a clamping stud as a metallic anchor for a keystone or locking block at the interior of the pipe.

Referring now to the drawing and first, particularly, to FIG. 1 thereof, there is shown a pipe 2 in the interior 1 of which there flows a gas with a temperature of more than 700° C., for example, which may furthermore be under an overpressure or excess pressure with respect to the atmosphere. The pressure difference is absorbed by the wall of the pipe 2. The pipe interior 1 is defined by a gas guide tube 3, which could be referred to, in the case of a corresponding lining of a vessel, as an inner vessel. The gas guide tube 3 is made up of individual segments 3a and 3b which engage or lock with one another by tongue and groove and together form the gas guide tube 3. This gas guide tube 3 may also be constructed as a momolithic pipe or a monolithic body. At the outer circumference of the gas guide tube 3, locking blocks or keystones 4 adjoin or abut the latter. These keystones 4 are of wedge-shaped construction and have a large outer cross-sectional area and, on the inside, at the location of contact thereof with the gas guide tube 3, a small inner cross-sectional area.

As shown in FIG. 3, the keystones 4 are firmly connected to the gas guide tubes 3 by means of metallic anchors 5. Between the keystones 4 of respective pairs thereof, an insulating block 6 is inserted, which is likewise a shaped or molded block, like the keystone or locking block 4, but may also be fiber-filled molded shell or a precast slab filled with loose material. In the illustrated embodiment, a further layer of locking blocks or keystones 4a with interposed insulating blocks 6a is provided. Between the outer circumference of this layer of blocks 4a and 6a and the pipe 2 per se, a casting compound 7 is disposed, filling the assembly gap between the locking blocks or keystones 4a and the insulating blocks 6a, on the one hand, and the inner wall surface of the pipe 2, on the other hand, and also serving to equalize or compensate for manufacturing tolerances of the pipe 2.

FIG. 2 shows in longitudinal section that the shaped or molded blocks form individual cylindrical sections which lock one with the other by tongue and groove 8, 9, 10. As is apparent especially from FIGS. 1 and 3, a gap is located between the locking blocks or keystones 4 and the insulating blocks 6a adjoining them on the outside. This gap exists primarily in the cold condition. Since the expansion coefficient $\alpha$ of the metallic anchor 5 is considerably larger than the expansion coefficient $\alpha$ of the ceramic keystones or locking blocks 4, the latter travel outwardly with increasing temperature. This makes room for every insulating block which is disposed between two locking blocks or keystones, so that the respective insulating block, in turn, can expand in accordance with the expansion coefficient thereof.

The expansion behavior of the metallic anchors of the insulating and locking blocks or keystones can be adjusted through the choice of the wedge angle of the locking blocks or keystones so that no appreciable gaps between the individual blocks and also no stresses are produced at all temperatures that may arise. If the pipe or the vessel is heated, only a small widening or increase of the diameter of the inner lining is therefore produced. This increase or widening corresponds approximately to the expansion of the (colder) pipe 2, so that a construction largely free of thermal stresses is provided.

In order to ensure that the locking blocks or keystones 4 will travel outwardly in a defined manner when the temperature rises, the metallic anchor 5 is advantageously provided with a disc-like enlargement or widened portion 11 which engages on the inside with a surface of the locking block 4 or keystone and forces the latter outwardly when the mechanical anchor 5 expands or elongates.

There are claimed:

1. A hollow cylindrical body such as a tube or vessel for receiving hot gas comprising an inner lining formed of an inner cylindrical wall and wedge-shaped molded blocks with radially outwardly partly narrowing and partly widening cross sections disposed at the outer circumference thereof, metallic anchoring means for fastening part of said molded blocks to said inner wall, the remainder of said molded blocks being disposed between the fastened blocks without any binding intermediate layers, and an outer cylindrical wall surrounding said molded blocks, the molded blocks fastened by said metallic anchoring means to said inner wall being keystones having a radially inwardly narrowing cross section and binding the remainder of the molded blocks against the inner cylindrical wall.

2. The hollow cylindrical body according to claim 1 including a quantity of casting material disposed between the inner lining and said outer cylindrical wall.

* * * * *